US006178546B1

(12) United States Patent
McIntyre

(10) Patent No.: US 6,178,546 B1
(45) Date of Patent: Jan. 23, 2001

(54) SYSTEM AND METHOD OF MAKING SOFTWARE PRODUCT DELIVERABLES

(75) Inventor: Kurt A. McIntyre, Plano, TX (US)

(73) Assignee: Alcatel USA Sourcing, L.P., Plano, TX (US)

( * ) Notice: Under 35 U.S.C. 154(b), the term of this patent shall be extended for 0 days.

(21) Appl. No.: 09/144,761

(22) Filed: Aug. 31, 1998

(51) Int. Cl.[7] .................................................. G06F 9/45
(52) U.S. Cl. ......................... 717/3; 717/3; 717/11
(58) Field of Search .................. 717/3, 4, 11; 705/22, 705/28, 29; 709/223, 225

(56) References Cited

U.S. PATENT DOCUMENTS

| | | | | |
|---|---|---|---|---|
| H1743 | * | 1/1999 | Graves et al. | 700/236 |
| 4,887,206 | * | 12/1989 | Natranjan | 705/29 |
| 5,216,593 | * | 6/1993 | Dietrich et al. | 345/467 |
| 5,412,576 | * | 5/1995 | Hansen | 700/104 |
| 5,712,989 | * | 1/1998 | Johnson et al. | 705/28 |
| 5,845,077 | * | 12/1998 | Fawcett | 709/221 |
| 5,860,068 | * | 1/1999 | Cook | 705/26 |
| 5,878,416 | * | 3/1999 | Harris et al. | 707/10 |
| 6,018,720 | * | 1/2000 | Fujimoto | 705/26 |
| 6,058,418 | * | 6/2000 | Kobata | 709/221 |
| 6,074,434 | * | 6/2000 | Cole et al. | 717/11 |
| 6,080,207 | * | 6/2000 | Kroening et al. | 717/11 |

OTHER PUBLICATIONS

Glicker et al, "The distributed object environmemnt suppport for a distributed object based system", ACM pp. 293–298, 1992.*
Chandramohan et al, "Hardware and software support for efficient exception handling", ASPLOS ACM pp. 110–119, Mar. 1994.*
Weske et al, "Work flow management in geoprocessing applications", ACM SIG pp. 88–93, Jan. 1998.*
Ehrich et al, "Making better manufacturing decision with AIM", pp. 552–558, Proc. winter simulation conf, 1997.*
Ketcham, "An integarted environment for modeling large scale electronics manufacturing", Proc. winter simulation conf, pp. 865–873, Jan. 1998.*

* cited by examiner

Primary Examiner—Paul R. Lintz
Assistant Examiner—Anil Khatri
(74) Attorney, Agent, or Firm—Baker Botts L.L.P.

(57) ABSTRACT

A method of making software product deliverables includes reading a description file having descriptions of items to be built, packaged, and/or installed, identifying the items, and then generating a build script to build the items described in the description file. An inventory of the items to be built and their respective locations in a build area is generated as well as a packaging list of the items to be included in each package.

37 Claims, 3 Drawing Sheets

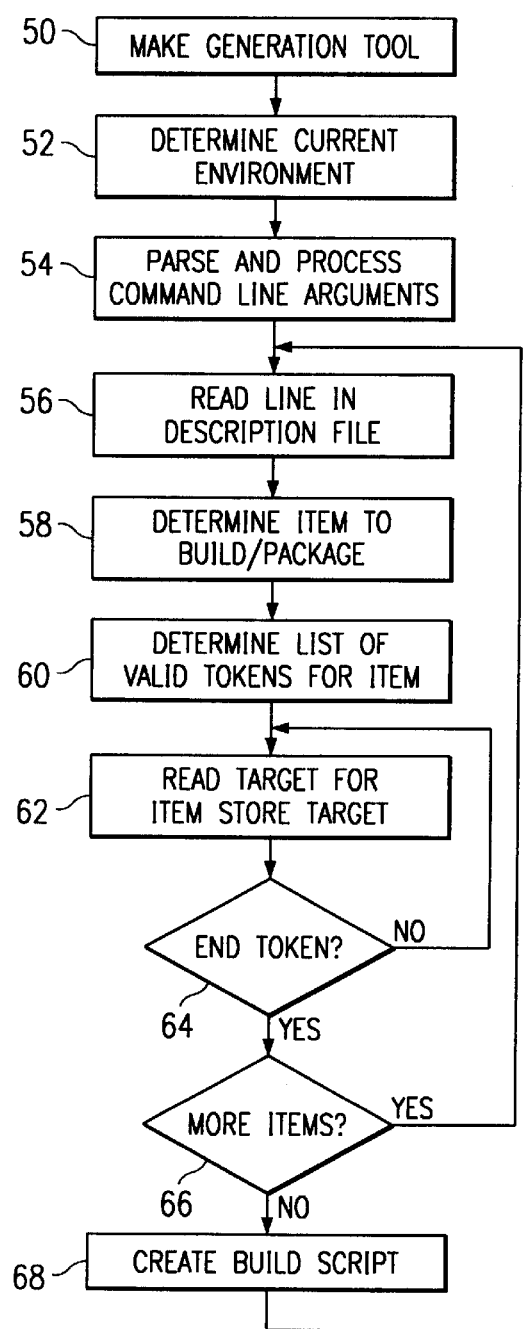
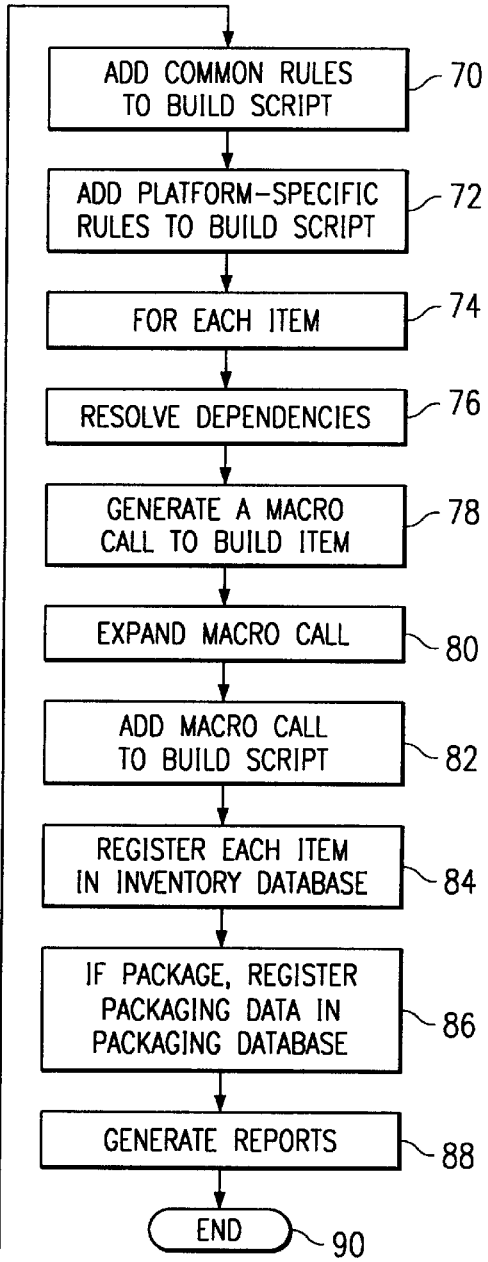
FIG. 2

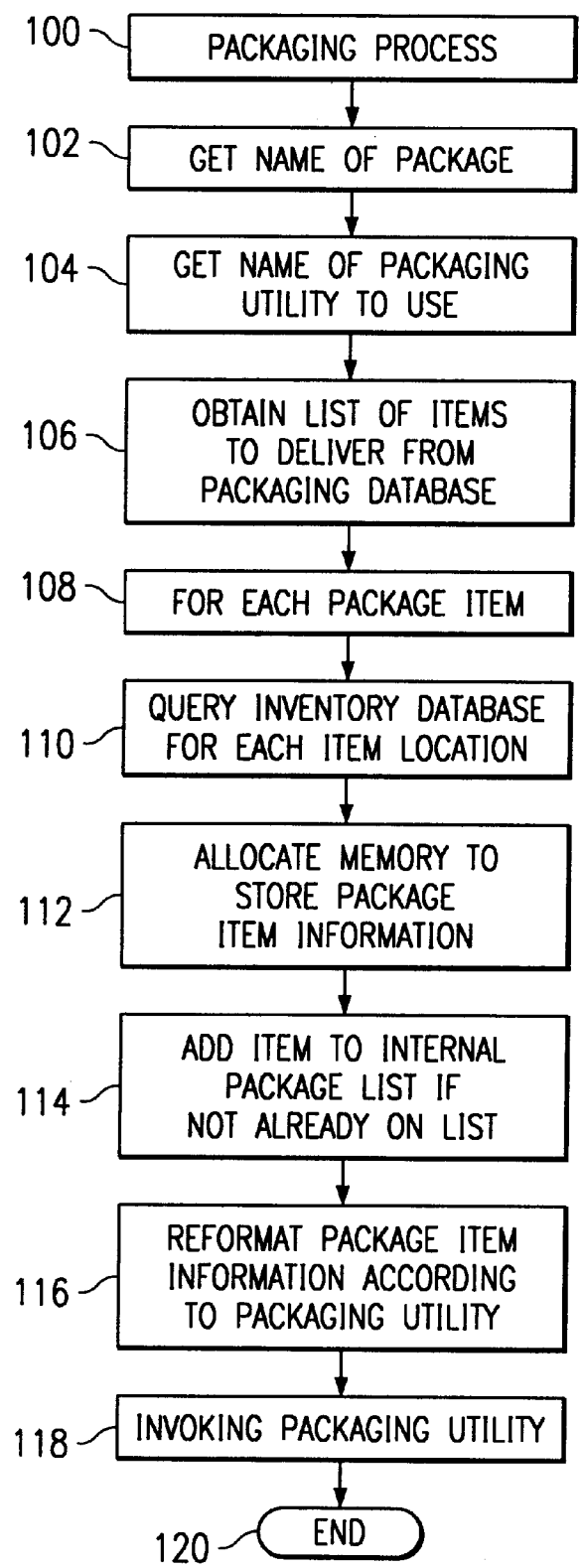

SYSTEM AND METHOD OF MAKING SOFTWARE PRODUCT DELIVERABLES

TECHNICAL FIELD OF THE INVENTION

This invention is related in general to the field of computer software, and more particularly, to a system and method of making software product deliverables.

BACKGROUND OF THE INVENTION

The most basic method of building software product deliverables is by using makefiles. A makefile is a build script written by the software developer which includes the rules for building the programs in the software product deliverable. As software products become larger and more complex, the makefile can become quite complicated and difficult to write and comprehend. It is also more difficult to share common rules and definitions with other builds for the same product or deliverable.

More advanced methods of building software product deliverables allow the developers to write a description file in a higher level format which is then used to generate the makefile. The description file also allows developers to refer to common rules defined in another file.

These existing methods to make software product deliverables have several disadvantages which are addressed and solved by the present invention.

SUMMARY OF THE INVENTION

It has been recognized that it is desirable to provide an integrated tool that allows developers to inform release engineers what products need to be delivered, how they should be packaged, and how to install the products. Further it is desirable to be able to share common rules so that all builds are performed consistently.

In one aspect of the invention, a method of making software product deliverables includes reading a description file having descriptions of items to be built, packaged, and/or installed, identifying the items, and then generating a build script to build the items described in the description file. An inventory of the items to be built and their respective locations in a build area is generated as well as a packaging list of the items to be included in each package.

In another aspect of the invention, a system of making software product deliverables includes a description file describing items to be built, packaged and/or installed, a rules database storing build macros, and a make process reading the description file and generating a build script according to the build macros in the rules database. The make process further generating an inventory of the items to be built and their respective locations in a build area, and a packaging list of the items to be included in each package, the inventory being stored in an inventory database and the packaging list being stored in a packaging database.

A technical advantage of the present invention is the provision of a single, easy to understand, user interface in the form of a description file to build, package and install software deliverables.

BRIEF DESCRIPTION OF THE DRAWINGS

For a better understanding of the present invention, reference may be made to the accompanying drawings, in which:

FIG. 2 is a flowchart of an embodiment of the make generation tool according to the teachings of the present invention; and FIG. 3 is a flowchart of an embodiment of a packaging process according to the teachings of the present invention.

DETAILED DESCRIPTION OF THE INVENTION

Figure 1:
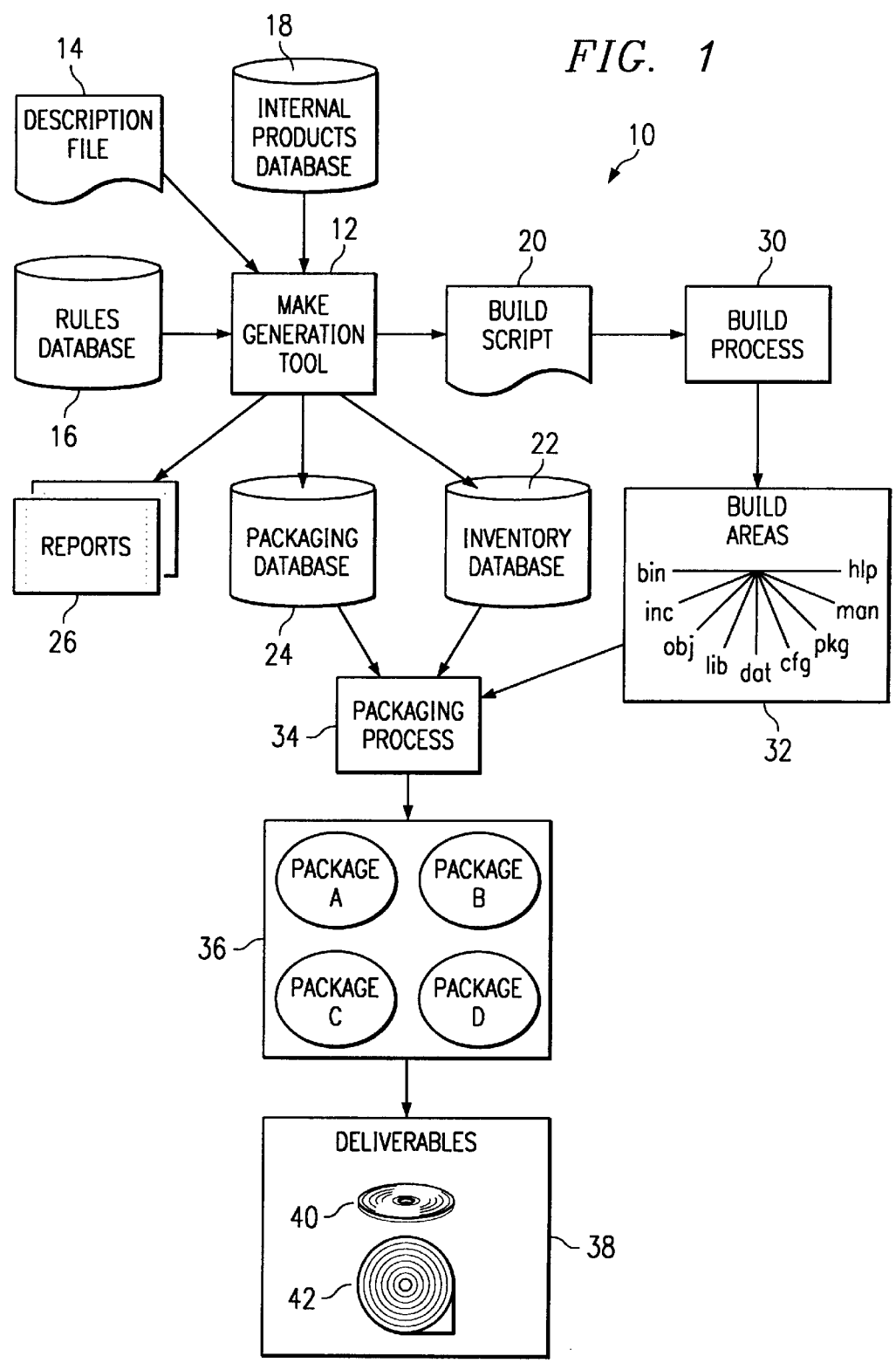
FIG. 1 is a simplified block diagram of a system of making software product deliverables according to the teachings of the present invention.

FIG. 1 is a simplified block diagram of a system of making software product deliverables 10 according to the teachings of the present invention. System 10 includes a make generation tool or make process 12 that receives input or reads a description file 14, a rules database 16 and an internal products database 18. Description file 14 may be a flat ASCII text file composed by the software developer which details the software items that he or she desires to build, package and install. A build script 20, an inventory database 22, a packaging database 24, and reports 26 are generated by make generation tool 12.

Description file 14 contains declarations of tokens global to the rest of the file and target declaration entries for the current directory. Tokens are of the form:

token>value

Target entries are used to describe items that are to be built, packaged or installed by make generation tool 12. Individual target entries may override global token values when appropriate. To aid developers in the preparation of description file 14, templates are provided and may be used to prepare description file 14. Details of the description file format are described below.

Rules database 16 is another input to make generation tool 12. Rules database 16 contains rules or make macros common to all operating system platforms and also rules specific to particular operating system platforms. These rules are macro definitions that are used to configure a build script 20 specific to an operating system platform. Because the rules are contained in rules database 16 accessible to make generation tool 12 during all software product deliverable make processes to ensure build consistency.

Another possible input to make generation tool 12 is internal products database 18. Internal products database 18 contains a listing of internal and third party software components such as header files and libraries and their official installed locations. These software components may be grouped into products and be referred to by name so that needed header files and libraries are easily referenced by other target entries. Internal products database 18 also serves as a central repository for the locations of all installed products.

Build script 20 drives a build process 30 to build items originally specified in description file 14. These items are moved to a build area 32, which is a directory with one or more subdirectories. Build area 32 may be a private build area accessible only to a specific developer or build/release group or it may be a public build area used for performing group builds or internal releases. Build script 20 may be configured to first search a private build area for libraries and include files and then search the public build area if those files are not found in the private build area. In this manner, developers can update their own libraries and programs and still reference other developer's files in the public build area. Each build area 32 may include the following subdirectories: bin, inc, obj, lib, dat, cfg, pkg, and man following traditional UNIX directory naming conventions.

Inventory data from inventory database 22 and packaging data from packaging database 24 are then used by a packaging process 34 to create packages 36. Inventory database 22 contain entries on each built item in build area 32. Each inventory entry contains the item name, type, and location of the item. Item name may be a filename and the location refers to the path to the file in build area 32. An item may be a library, program, data, or help file.

Packaging database 24 contains information on what items are to be included in each package. Package entries in packaging database 24 may include the package name, type, version, and path to an install script. For each package entry, item names of items to be include in the package and the install location are also provided. A package may be of the type file, directory, or symbolic link. A directory type package specifies the install location or path on the target machine for the package. The install location may be specified by the directory path or the symbolic link, which is a predetermined logical path name used to refer to a directory or subdirectory.

Accordingly, packaging process 34 reads or queries packaging database 24 to determine what packages are to be delivered and what items are to be in each package. Packaging process 34 then reads inventory database 22 to determine where these items are located in build area 32. Products are then created from sets of packages 36 and copied onto physical storage media 38 such as CDs 40 and tapes 42.

At the end of build and packaging, reports 26 may be generated. Reports 26 may include a dependency report, which lists all inter-product dependencies and build directory dependencies. For each product, library or program, the source directories are listed. Reports 26 may also include a package report, which provides all file dependencies for a package. It lists the type of each file and the location where the file was copied from according to inventory database 22.

The inventory database and packaging database described above may be implemented as text files in a subdirectory or data files in a database which accepts and processes queries.

Make generation tool 12 may be configured by configuration variables supplied by the user. The configuration variables may specify the location of build area, the compiler to be used, the product database to be used, whether recursive build in all directories is to be performed, whether to generate reports, and all other information needed by make generation tool to create build script 20. Thus, configuration variables may be a boolean value, a path location, a token name, a file name, a target type, etc. Values for configuration variables may be set by command line arguments, by environment variables, in a user resource file, or in a group resource file. A user resource file sets values for configuration variables for a single developer and typically resides in the home directory of the developer. A group resource file, on the other hand, is typically set up for a development group so that configuration variable assignments may be shared among developers in the group. Because there are many ways to set configuration variable values, make generation tool 12 may generate a listing of all variables, the value of the variables and the sources that determined the variable values. This listing may be included in build script 20.

As described above, make generation tool 12 uses description file 14 to create build script 20. Description file 14 may be divided into two sections, the first providing declarations of global tokens, and the second providing declarations of all target entries for the current directory. Target entries describe items that are to be built, installed, and/or packaged.

The basic tokens are described in the context of a number of examples below. In the first example, a program target is specified which is built from two source files, hello.c and world.c. The program target is compiled and linked with no special options or debug flags.

| | |
|---|---|
| TARGET> | Program |
| NAME> | helloWorld |
| SRCS> | hello.C world.C |
| OBJS> | hello.o world.o |
| END> | |

It may be seen that the token TARGET> specifies the type of item to be built, packaged or installed. Valid target types include executable programs, variables, libraries, object files, include files, install scripts, data files, configuration files, manual pages, and help files. The NAME> token allows the developer to provide the name of the item. The SRCS> token provides the source file names. The OBJS> provides the object file names. Each target ends with an END> token.

In the next example, a library target is specified which is built from four source files. The library target is to be compiled with the default debug flags, -g. This example also illustrates the use of substitution macros. The ${SRCS:.C=.H} macro will create a list of filenames replacing the .C suffix with the .H suffix. The macro ${SRCS:.C=.o} is substituted likewise.

| | |
|---|---|
| TARGET> | Library |
| NAME> | trmci |
| SRCS> | TrMciTransReq.C TrMciCallBlock.C |
| | TrMciTransSucc.C TrMciStatus.C |
| OBJS> | ${SRCS:.C=.o} |
| END> | |

Object targets can be used to create individual object files which can be incorporated into multiple programs. Object files built with object targets are installed in the obj subdirectory in build area 32 ($STAGE/obj). In this example, an object target is specified which builds a single object file. This object file is then referenced in the OBJS> line of two program targets. Lines beginning with "!" are comment lines and are used here to demarcate the groups of tokens for each item.

| | |
|---|---|
| TARGET> | Object |
| SRCS> | MSpUtil.C |
| OTHERFLAGS> | srcType=C++ |
| END> | |
| ! | |
| TARGET> | Program |
| NAME> | trans |
| SRCS> | Trans.C CallBlk.C DblF.C |
| OBJS> | ${SRCS:.C=.o}$(STAGE)/obj/ |
| | MspUtil.o |
| OTHERFLAGS> | srcType=C++ |
| END> | |
| ! | |
| TARGET> | Program |
| NAME> | dcr |
| SRCS> | DCR.C Dap.C |
| OBJS> | ${SRCS:.C=.o}$(STAGE)/obj/ |
| | MspUtil.o |
| OTHERFLAGS> | srcType=C++ |
| END> | |

Script, data, configuration, include, man, and help targets are supplied so that other types of files besides libraries and programs can be installed in build areas 32. By default, scripts are installed in $STAGE/bin, data files in $STAGE/dat, include files in $STAGE/inc, man pages in $STAGE/man, configuration files in $STAGE/cfg, and help files in $STAGE/hlp. You can specify a different build area directory with the STAGE flag in OTHERFLAGS> line.

```
TARGET>        Script
NAME>          setup.csh startup.csh shudown.csh
END>
!
TARGET>        Data
NAME>          db.table
END>
!
TARGET>        Config
NAME>          trans.cfg generic.cfg
END>
!
TARGET>        Include
NAME>          TrDefs.H TrGeneric.H TrNames.H
END>
!
TARGET>        Man
NAME>          trans.1 megahub.1
OTHERFLAGS>    $(STAGE)/man/man1
END>
!
TARGET>        Help
NAME>          readme
END>
```

As described above, make generation tool 12 may operate recursively over a set of directories. To do this, the names of the subdirectories in each parent-level description file is included. For example:

SUBDIRS> subsys1 subsys2

From the parent directory, invoke make generation tool 12 with the -recurse option is used to build all the build scripts.

The next example illustrates how a package target may be specified in the description file.

```
TARGET>        Package
NAME>          Trans
VERSION>       2.0
DESCRIPTION>   Translator Package
DEPEND>        TelePlat
PREINSTALL>    trans.preinstall
POSTINSTALL>   trans.postinstall
PREREMOVE>     trans.preremove
POSTREMOVE>    trans.postremove
OTHERFLAGS>    pkgType=SUN
!
PKGITEM>       trans.exe
FILETYPE>      Regular
INSTALLDIR>    /msp/trans/bin
PROTECTION>    0755
!
PKGITEN>       transCfgColl
FILETYPE>      Regular
INSTALLDIR>    /msp/trans/cfg
PROTECTION>    0444
!
END>
```

The VERSION> of the package is a required token value. The DESCRIPTION> token provides a brief description of the package. The DEPEND> token lists any packages which this package depends on. Installation will fail if any of the listed depend packages are not already installed.

The PREINSTALL>, POSTINSTALL>, PREREMOVE>, POSTREMOVE> tokens allow the execution of a shell script before and after installation, and before and after package removal. The pkgType flag on the OTHERFLAGS> token indicates that the Sun packaging utility should be used.

After the OTHERFLAGS> token, all items to be included in package are listed. This package consists of two package items: a file named trans.exe and a collection of configuration files identified by the name transCfgColl. The trans.exe and configuration files must have been built and installed in build area 32 in order for the package to successfully locate the files. This means that either the current directory must have targets for these files or another directory included in the current build did. For each item, the file type is specified by the FILETYPE> token. The valid file types include regular, directory, symbolic link, and linked file.

Referring to FIG. 2, a flowchart 50 showing an exemplary process flow for make generation tool 12 is shown. In block 52, make generation tool 12 first obtains and determines information on the current environment, such as operating system, version, and time. This current environment information is later inserted into the build script. In block 54, command line arguments entered by the user are parsed and processed. As described above, configuration variables may be set by command line arguments in this manner and may include information such as which compiler to use during the build process, where is the build area, and whether to build recursively for subdirectories. Thereafter, a first line in the description file is read in block 56. As described above, each non-comment line in the description file may include a token and its value. Each item to be built, packaged or installed is described by one or more token and value lines, with the first token being the TARGET> token. The TARGET> token generally describes the item type, and is determined in block 58. For each item type or target, there are a predetermined set of required tokens and a predetermined set of optional tokens, which are determined in block 60. In this manner, the token is read and stored, as shown block 62. The token and its value are stored in memory that has been allocated previously. In block 64, it is determined whether the token was the END> token. If not, the next token is read and stored, as shown in block 62. If the END> token has been encountered in block 68, then it is determined if more items or targets are described in the description file in block 66. If there are more items to be processed, then the next line in the description file is read, as shown in block 56. If there are no more items in the description file then all targets in the description file has been read and stored in memory and the build script is created therefrom. Thereafter in block 70, common rules are added to the build script. In block 72, rules specific to operating system platforms are added to the build script. For each item in block 74, make generation tool 12 resolves any cross references between build items and verifies that dependencies are in the inventory database, as shown in block 76.

In blocks 78 and 80, a macro call to build the item is generated and then expanded. A macro call is basically a set of commands to build a particular type of item. For example, to build a program, each source file specified by the SRCS> token is compiled and stored in corresponding object files and all the object files together into an executable file. For a library, each source file is compiled and stored in corresponding object files and then archived into a library file. For a package, a new package is created with the given name, version, and install script. For each item in the item list of the package, the inventory database is queried to obtain the item location, and the item is added to the current package. A macro definitions file (not shown) may be consulted to expand the macro calls. The macro call is then added to the build script in block 82.

In block 84, each item is registered in the inventory database. If the build item is a package, then data about the package such as identity of items in the package and version are registered in the packaging database, as shown in block 86. Thereafter, if the description file indicates that reports are to be generated, then they are generated, as shown In block 88. The make generation tool process ends in block 90.

From the foregoing, it may be seen that make generation tool makes at least two passes over the build targets in the description file. In the first pass, the build targets are read and then stored in memory allocated for this purpose. In the second pass, the build script is created from the build targets stored in memory.

Referring to FIG. 3, a flowchart 100 of an exemplary packaging process flow is shown. Packaging is performed when testing has been completed testing has been completed and the engineers are satisfied that the builds are functioning according to specification. The packaging process is executed when all items in a package have been built. First, the name of the package to be built is obtained in block 102. The package name may be passed as a parameter to the packaging process. In block 104, the name of the packaging utility is then obtained. The make generation tool is capable of using multiple packaging utilities. In block 106, a list of items to deliver is then obtained from the packaging database. For each package item (block 108), the inventory database is queried to obtain the item location in the build area, as shown in block 110. Memory is then allocated to store the package item information, as shown in block 112. In block 114, the item is then added to the internal products database if it is not already there. Package item information is then reformatted according to the package utility that will be used, as shown in block 116. The packaging utility is then invoked in block 118. The package utility copies each item specified in the packaging database into its respective packages. The process ends in block 120. As described above, the packages are then grouped into software products and copied onto storage media such as tape or CDs.

Operating in this manner, system and method of making software product deliverables of the present invention have many advantages over conventional tools. The description file presents a common and easy to understand interface to the user. The description file contains all the information to build, stage, and package all elements listed. Rules and definitions can be shared so that all objects and programs can be built in a consistent manner. In addition, all information about whether files are deliverable and where they are installed on the target machine is specified in the description file. This allows the generation of all necessary files for packaging and installation. Further, user will find the standard set of tokens easier to use. The internal products database allows the grouping of internal software components which can be referenced by name to ensure all necessary libraries and header files are included in the packages. Because the description file is not platform-specific, it may be moved to another machine to perform the make, build and package process. Further, the system may be set up to recursively operate from anywhere in the directory structure. Additionally, the user may query the inventory database for the latest information on the contents of the build area, and further query the packaging database for the contents of each package.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of making software product deliverables, comprising:

reading a description file having descriptions of software program items to be built, packaged, and/or installed;

identifying the software program items;

generating a build script to build the software program items described in the description file;

generating an inventory of the software program items to be built and their respective locations in a build area; and generating a packaging list of the software program items to be included in each package.

2. The method, as set forth in claim 1, further comprising storing the inventory in an inventory database.

3. The method, as set forth in claim 1, further comprising storing the packaging list in a packaging database.

4. The method, as set forth in claim 1, further comprising reading the packaging list for identifying software program items to be included in a package and reading the inventory for locating the software program items in the build area.

5. The method, as set forth in claim 1, further comprising:

building the software program items according to the build script; and storing the built software program items in the build area.

6. The method, as set forth in claim 5, wherein the build software program item storing step comprises storing the built items in specific subdirectories according to item type.

7. The method, as set forth in claim 1, further comprising reading at least one token and its value describing each software program item in the description file.

8. The method, as set forth in claim 1, further comprising reading a set of required tokens and values and a set of optional tokens and values in the description file.

9. The method, as set forth in claim 1, further comprising:

reading a target token and its value for a software program item from the description file;

reading a name token and its value; and reading an object name of the software program item.

10. The method, as set forth in claim 9, further comprising reading a products token and its value for a list of products dependent on the software program item.

11. The method, as set forth in claim 1, further comprising:

reading a target token and its value for a library item associated with the software program item from the description file;

reading a name token and its value; and reading an object name of the library item.

12. The method, as set forth in claim 11, further comprising reading a products token and its value for a list of products dependent on this library item.

13. The method, as set forth in claim 1, further comprising storing the read software program items in memory.

14. The method, as set forth in claim 1, further comprising:

reading the packaging list from the packaging database and identifying the software program items to be included in each package;

reading the inventory from the inventory database and determining the location of the software program items in the build area; and fetching the software program items and including the items in the packages.

15. The method, as set forth in claim 14, further comprising:
creating products from the packages; and
downloading the products onto portable storage media.

16. The method, as set forth in claim 1, further comprising:
accessing a rules database to obtain build macros for each software program item; and
adding the build macros to the build script.

17. A method of making software product deliverables, comprising:
reading a description file having descriptions of items to be built, packaged, and/or installed;
identifying the items;
generating a build script to build the items described in the description file;
generating an inventory of the items to be built and their respective locations in a build area; and
generating a packaging list of the items to be included in each package;
accessing an internal products database for a list of software components and their official install locations.

18. A method of making software product deliverables, comprising:
reading a description file having descriptions of items to be built, packaged, and/or installed;
identifying the items;
generating a build script to build the items described in the description file;
generating an inventory of the items to be built and their respective locations in a build area; and
generating a packaging list of the items to be included in each package;
generating a dependency report indicative of dependencies between internal products.

19. A method of making software product deliverables, comprising:
reading a description file having descriptions of items to be built, packaged, and/or installed;
identifying the items;
generating a build script to build the items described in the description file;
generating an inventory of the items to be built and their respective locations in a build area; and
generating a packaging list of the items to be included in each package;
configuring variables by using values passed as command line arguments.

20. A method of making software product deliverables, comprising:
reading a description file having descriptions of items to be built, packaged, and/or installed;
identifying the items;
generating a build script to build the items described in the description file;
generating an inventory of the items to be built and their respective locations in a build area; and
generating a packaging list of the items to be included in each package;
configuring variables by accessing values stored in a resource file.

21. A method of making software product deliverables, comprising:
reading a description file having descriptions of software program items to be built, packaged, and/or installed;
identifying the software program items;
generating a build script to build the software program items described in the description file;
generating an inventory of the software program items to be built and their respective locations in a build area;
generating a packaging list of the software program items to be included in each package;
building the software program items according to the build;
storing the built software program items in the build area;
reading the packaging list from the packaging database and identifying the software program items to be included in each package;
reading the inventory from the inventory database and determining the location of the software program items in the build area; and
fetching the software program items and including the software program items in the packages.

22. The method, as set forth in claim 21, further comprising reading the packaging list for identifying software program items to be included in a package and reading the inventory for locating the software program items in the build area.

23. The method, as set forth in claim 22, wherein the build software program item storing step comprises storing the built software program items in specific subdirectories according to item type.

24. The method, as set forth in claim 21, further comprising reading at least one token and its value describing each software program item in the description file.

25. The method, as set forth in claim 21, further comprising reading a set of required tokens and values and a set of optional tokens and values in the description file.

26. The method, as set forth in claim 21, further comprising:
reading a target token and its value for a software program item from the description file;
reading a name token and its value; and
reading an object name of the software program item.

27. The method, as set forth in claim 26, further comprising reading a products token and its value for a list of products dependent on the software program item.

28. The method, as set forth in claim 21, further comprising:
reading a target token and its value for a library item associated with a software program item from the description file;
reading a name token and its value; and
reading an object name of the library item.

29. The method, as set forth in claim 21, further comprising storing the read software program items in memory.

30. The method, as set forth in claim 21, further comprising:
creating products from the packages; and
downloading the products onto portable storage media.

31. The method, as set forth in claim 21, further comprising:
accessing a rules database to obtain build macros for each software program item; and
adding the build macros to the build script.

32. A method of making software product deliverables, comprising:
- reading a description file having descriptions of items to be built, packaged, and/or installed;
- identifying the items;
- generating a build script to build the items described in the description file;
- generating an inventory of the items to be built and their respective locations in a build area;
- generating a packaging list of the items to be included in each package;
- building the items according to the build;
- storing the built items in the build area;
- reading the packaging list from the packaging database and identifying the items to be included in each package;
- reading the inventory from the inventory database and determining the location of the items in the build area; and
- fetching the items and including the items in the packages;
- accessing an internal products database for a list of software components and their official install locations.

33. A method of making software product deliverables, comprising:
- reading a description file having descriptions of items to be built, packaged, and/or installed;
- identifying the items;
- generating a build script to build the items described in the description file;
- generating an inventory of the items to be built and their respective locations in a build area;
- generating a packaging list of the items to be included in each package;
- building the items according to the build;
- storing the built items in the build area;
- reading the packaging list from the packaging database and identifying the items to be included in each package;
- reading the inventory from the inventory database and determining the location of the items in the build area; and
- fetching the items and including the items in the packages;
- generating a dependency report indicative of dependencies between internal products.

34. A method of making software product deliverables, comprising:
- reading a description file having descriptions of items to be built, packaged, and/or installed;
- identifying the items;
- generating a build script to build the items described in the description file;
- generating an inventory of the items to be built and their respective locations in a build area;
- generating a packaging list of the items to be included in each package;
- building the items according to the build;
- storing the built items in the build area;
- reading the packaging list from the packaging database and identifying the items to be included in each package;
- reading the inventory from the inventory database and determining the location of the items in the build area; and
- fetching the items and including the items in the packages;
- configuring variables by using values passed as command line arguments.

35. A method of making software product deliverables, comprising:
- reading a description file having descriptions of items to be built, packaged, and/or installed;
- identifying the items;
- generating a build script to build the items described in the description file;
- generating an inventory of the items to be built and their respective locations in a build area;
- generating a packaging list of the items to be included in each package;
- building the items according to the build;
- storing the built items in the build area;
- reading the packaging list from the packaging database and identifying the items to be included in each package;
- reading the inventory from the inventory database and determining the location of the items in the build area; and
- fetching the items and including the items in the packages;
- configuring variables by accessing values stored in a resource file.

36. A system of making software product deliverables, comprising:
- a description file describing software program items to be built, packaged and/or installed;
- a rules database storing build macros; and
- a make process reading the description file and generating a build script according to the build macros in the rules database, the make process further generating an inventory of the software program items to be built and their respective locations in a build area, and a packaging list of the software program items to be included in each package, the inventory being stored in an inventory database and the packaging list being stored in a packaging database.

37. The system, as set forth in claim 36, further comprising a packaging process reading the packaging list for identifying software program items to be included in a package and reading the inventory for locating the software program items in the build area.

* * * * *